US007355986B2

(12) United States Patent
Vanderveen et al.

(10) Patent No.: US 7,355,986 B2
(45) Date of Patent: Apr. 8, 2008

(54) RECONFIGUREABLE NETWORK NODE

(75) Inventors: Keith B. Vanderveen, Tracy, CA (US); Edward B. Talbot, Livermore, CA (US); Laurence E. Mayer, Davis, CA (US)

(73) Assignee: Sandia Corporation, Livermore, CA (US)

( * ) Notice: Subject to any disclaimer, the term of this patent is extended or adjusted under 35 U.S.C. 154(b) by 1035 days.

(21) Appl. No.: 10/277,141

(22) Filed: Oct. 22, 2002

(65) Prior Publication Data

US 2004/0076164 A1 Apr. 22, 2004

(51) Int. Cl.
H04L 12/28 (2006.01)

(52) U.S. Cl. ...................................... 370/255; 370/400
(58) Field of Classification Search ........ 370/254–256, 370/401, 400; 455/65.7
See application file for complete search history.

(56) References Cited

U.S. PATENT DOCUMENTS

| | | | | |
|---|---|---|---|---|
| 5,764,957 A | * | 6/1998 | Kihl et al. | 709/235 |
| 6,487,393 B1 | * | 11/2002 | Davenport et al. | 455/67.7 |
| 6,594,268 B1 | * | 7/2003 | Aukia et al. | 370/400 |
| 7,106,702 B2 | * | 9/2006 | Hua et al. | 370/255 |
| 7,116,643 B2 | * | 10/2006 | Huang et al. | 370/255 |
| 7,200,120 B1 | * | 4/2007 | Greenberg et al. | 370/254 |

OTHER PUBLICATIONS

Scheinfeild, Michael et al., "Acquisition Time Calculation and Influence of Vibrations for Micro satellite Laser Communication in Space," *Acquisition, Tracking, and Pointing XV*, Proceedings of SPIE, pp. 195-205, vol. 4365 (2001).

Scott, William B., "'NANOSAT' Technologies Ready for National Security Missions," *Aviation Week's*, Dec. 9, 2002, <http://www.aviationnow.com/content/ncof/ncf_n59.htm>.

"Perfect images transmitted via a laser link between Artemis and SPOT 4", *Spot Image Productions*, Dec. 9, 2002, <http://www.spotimage.fr/home/news/press/artemis/artemisimag.htm>.

Su, William et al, "Mobility Prediction and Routing in Ad Hoc Wireless Networks," University of California, Computer Science Department, Wireless Adaptive Mobility Laboratory, pp. 1-31, <(wsu,sjlee,gerla)@cs.ucla.edu>.

Nasipuri, A. et al., "A MAC Protocol for Mobile Ad Hoc Networks Using Directional Antennas," The University of Texas at San Antonio, Division of Computer Science, <nasipur,sye,jyou,hiromoto@cs.utsa.edu>.

Ko, Young-Bae et al., "Medium Access Control Protocols Using Directional Antennas in Ad Hoc Networks," Texas A&M University, Department of Computer Science, <youngbae,v0s5080,vaidya@cs.tamu.edu>.

* cited by examiner

*Primary Examiner*—Albert T. Chou
(74) *Attorney, Agent, or Firm*—Foley & Lardner, LLP

(57) ABSTRACT

Nodes in a network having a plurality of nodes establish communication links with other nodes using available transmission media, as the ability to establish such links becomes available and desirable. The nodes predict when existing communications links will fail, become overloaded or otherwise degrade network effectiveness and act to establish substitute or additional links before the node's ability to communicate with the other nodes on the network is adversely affected. A node stores network topology information and programmed link establishment rules and criteria. The node evaluates characteristics that predict existing links with other nodes becoming unavailable or degraded. The node then determines whether it can form a communication link with a substitute node, in order to maintain connectivity with the network. When changing its communication links, a node broadcasts that information to the network. Other nodes update their stored topology information and consider the updated topology when establishing new communications links for themselves.

50 Claims, 3 Drawing Sheets

RECONFIGUREABLE NETWORK NODE

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

BACKGROUND OF THE INVENTION

A network with a plurality of information processing nodes must provide communication links between the nodes so that they can exchange information. Conventional networks have a relatively fixed communication infrastructure even if different nodes come on-line and off-line at different times. This paradigm breaks down where the nodes move relative to each other and replacement communications links must be forged over a changing infrastructure or varying network topology.

Military command and control is one example of a network which requires an extensive communications infrastructure for optimum effectiveness. Establishing a communications infrastructure for command and control is costly. This infrastructure may be unavailable during a conflict because an adversary has taken steps to deny or destroy infrastructure elements that have been deployed prior to the conflict. Moreover, a centralized communication infrastructure deployed in the battlefield becomes an attractive target. A decentralized networked communications structure and methodology would assure that a communications infrastructure exists wherever and whenever assets are deployed. Such a communications infrastructure requires nodes which can establish communications links with other fixed or moveable nodes to form a network and can join or drop off from an existing network without disrupting other communications.

SUMMARY OF THE INVENTION

In view of the limitations of technologies discussed above, it is one object of the invention to provide a network of nodes which can predict the failure or reduction of performance of existing communication links and can act to form new communication links.

According to the invention, nodes in a network having a plurality of nodes can establish communication links with other nodes in the plurality using available transmission media, as the ability to establish such links becomes available and desirable. Such nodes predict when existing communications links will fail, become overloaded or otherwise degrade network efficiency and act to establish substitute or additional links before the node's ability to communicate with the other nodes on the network is adversely affected. According to the invention, nodes can use stored indicia such as memories to store network topologies. The nodes can also use stored indicia to store programmed link establishment rules and criteria. With this information, a processor in a node evaluates characteristics that will result in existing links becoming unavailable or degraded. Such characteristics can include relative distance and positions of other nodes, atmospheric conditions, information traffic conditions, life expectancy of other battery operated nodes and other characteristics that predict when a communications link will no longer provide optimal operation or will not be available. Knowing this information, the node can then determine whether it can form a communication link with a substitute node, in order to maintain its connectivity to the network. When a node changes its communication links, it broadcasts that information to the network, so that other nodes can update their stored topology information and take the updated topology into consideration when determining establishment of new communications links for themselves.

BRIEF DESCRIPTION OF THE FIGURES

The invention is described herein with reference to the Figures in which.

DETAILED DESCRIPTION OF THE INVENTION

Figure 1:
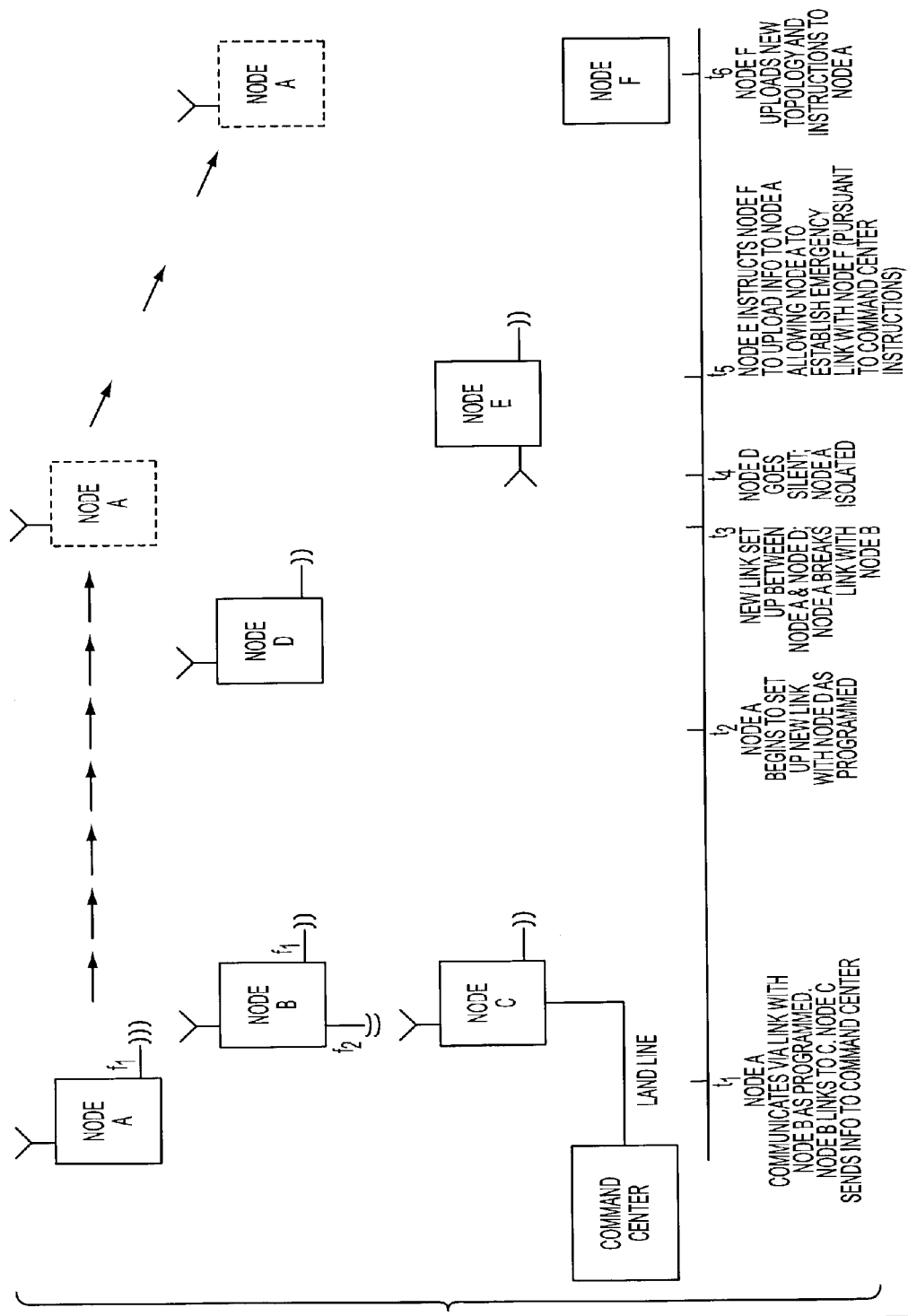
FIG. 1 illustrates a network of nodes according to the invention which form new communications links at different points in time.

A decentralized and opportunistic network according to the invention has nodes which establish communication links as needed or as desired to form a network with variable topology. The invention has particular application to military scenarios, but those of ordinary skill will recognize that the principles of the invention have general application and that the invention is not limited to military application. Virtually any deployed asset can include such a node. No centralized network administration function is required. Each node is capable of establishing communications links with other nodes that are within range. As more assets are deployed, aggregate bandwidth and throughput increase. A network of such nodes may use any available data transmission medium, including existing wires or fibers, free space RF, or free space optical or any combination thereof. Thus, according to the invention, different nodes participating in the network may communicate over different media, according to their built-in capabilities, media availability and network needs and constraints. For example, according to the invention nodes may employ highly directional wireless communications media such as extremely high frequency (EHF) RF or free space optical. Such highly directional media have the advantages of greater range, lower interference from other emitters in the same medium, and lower probability of detection over omnidirectional RF. Use of highly directional wireless media requires tight integration between the physical and network layers, especially when some Instant Internet nodes are moving. A particular innovation of Instant Internet to cope with node movement in the context of highly directional media is the ability of the Instant Internet network layer to request the establishment of links, a feature not supported by existing ad hoc network architectures.

According to the invention, nodes can establish links between each other to form a network among themselves, thus creating an Instant Internet. Such networks may also provide the ability to communicate with other Instant Internet networks as they come on-line or with previously established networks, such as a military or corporate network or commercially available network resources such as the Internet and the World Wide Web. Instant Internet nodes may vary greatly in their communications, processing, and sensing capabilities. Consequently, Instant Internet hardware, algorithms, and protocols are modular, so that a node may implement those aspects of the protocol that it can support. For example, a node may have no native transmission capability, relying instead upon reflecting back and modulating the signal of another node to communicate. An Instant Internet protocol according to the invention accommodates such nodes by directing other nodes with compatible transmission capability to periodically communicate with them.

An Instant Internet according to the invention is fault-tolerant and rapidly re-configurable. Each node autonomously establishes communication links with nodes within range, adding or dropping links as needed to optimize communications and meet geographic constraints and throughput requirements. As new nodes come into range, new links are evaluated and established as needed. As nodes are destroyed or move in or out of range, the network is seamlessly reconfigured. Nodes may also establish and remove communications links for security purposes. For example, a node may establish a link temporarily and later remove that link to avoid detection. A node according to the invention may also replace a link with a different link through another media should the media become unavailable, overwhelmed with traffic, or have its security compromised. For example, in order to achieve stealth operation in a threatened environment a node according to the invention could elect to establish links only over the most secure media or only over a less threatened part of the network. In a less threatened environment the same node may use additional, less secure communications links.

Instant Internet nodes according to the invention may have the ability to store and forward information. Periodically, a node may find itself out of contact with another node to which it wants to send data. The node could be out of contact because it is outside the range of reliable communications over the available media or because the node has detected a threat and is remaining quiet to avoid detection. During such situations, the node will store data awaiting contact with the destination node. When a data link is established, data stored in the node is forwarded.

These and other features, singly and in combination, make Instant Internet different from wireless LAN technologies such as IEEE 802.11 and Bluetooth, from cellular telephony standards, and from ad hoc network technologies proposed to date.

According to the invention, an Instant Internet routing protocol uses mobility prediction and network layer signaling of link establishment to maintain connectivity in the face of topology changes, such as those due to node movement or failure. Each Instant Internet node capable of doing so maintains a map of the topology of the network, or at least a portion of the network local to the node (i.e. within some number of hops of the node). Each node capable of doing so maintains a model of the expected movement of each of its neighbors and potential neighbors, and uses this model to predict when a link that it has established with a neighbor will fall due to node movement (or for other predictable reasons, such as battery failure). When a link has failed or is about to fail, or when a node has a spare interface, the node looks for a new neighbor node with which to establish a link. The node selects which potential neighbor to establish a link with according to established network-level criteria. These criteria are stored in the node or built into a link establishment program stored and executed in the node, for example in a processor. In addition, according to the invention, a node with proper authorization could communicate or upload revised link establishment criteria to other nodes. The node also advertises the future establishment of this link to other nodes, so that they may take the future link's existence into account in their network planning. Thus, according to the invention at least some nodes on the network store information about the topology of the network which a processor in the node uses to direct establishment of communications links to other nodes in accordance with a programmed strategy or a strategy based on stored link establishment criteria. Such nodes may also receive information about links that are newly established or about to be established and update the information they store about the topology of the network.

FIG. 1 illustrates a network according to the invention in one possible military scenario. Those of ordinary skill will recognize that other military and non-military scenarios and configurations are possible within the scope of the invention. As shown in FIG. 1, Node A is a mobile node, such as an aircraft or tank, that communicates information over a frequency range f1. At time t1, node A is within range to communicate with node B over a link at frequency f1. Node B communicates with a Command Center on a link operating at a frequency f2, different from f1, so that Node A cannot communicate directly with the Command Center. Node B will relay reconnaissance information obtained by moveable Node A to Node C over the communications link operating at f2. Node C will route the information to the Command Center over the fixed link l1, thereby providing almost real time reconnaissance data. Node A and Node B are programmed to recognize that shortly after time t2, Node A will be outside of its communication range with Node B. Node A is also programmed to recognize that at time t2, before it loses its link with Node B, Node A should begin to set up a communications link with Node D. Node D will then relay Node A's information to Node B, who will pass it on the Command Center through Node C as previously discussed. Node A completes setting up its link with Node D at time t3 and begins to transmit reconnaissance information. Unexpectedly, Node D detects a threat or fails and shuts down, leaving Node A no communications link at time t4. Recognizing the circumstances, and the fact that Node A cannot communicate directly with Node C, the Command Center instructs Node C to communicate with Node E to instruct Node F to upload new link establishment criteria to Node A. Node C send the message to Node E on a link operating at frequency f2. Node E send the message to Node F at time t5. Node F, which can communicate at frequency f1, operates in a stealth mode and communicates only rarely. Node A was not originally programmed to establish a communications link with Node F for security purposes. In this case, the Command Center has determined that the presence of a potential threat to Node D, causing Node D to go silent, and the potential exposure of Node A at its current location justify a change to the current link establishment rules. In order to change these rules, Node A must be reprogrammed to attempt to establish a link with Node F. Thus, at time t6 node F transmits new link establishment rules to Node A, along with an authorization code that Node A will recognize, so that Node A will accept the new link establishment criteria.

The above example illustrates how a first node can establish a communications link with a second node and apply programmed link establishment rules and use its stored network topology information to establish a communication link with a third node before the first node loses its current communication link with the second node. It also illustrates how several nodes can work together in a network to adapt to changing network circumstances and to establish communications links that adapt to the circumstances. In addition, the above illustration demonstrates that a node can receive new link establishment rules to allow it to adapt to changes in the network. In addition to providing a dynamically re-configurable network, this feature can extend the useful life of nodes who use legacy technology by allowing them to be reprogrammed with new rules to establish communications links with other nodes capable of communicating with them.

Figure 2:
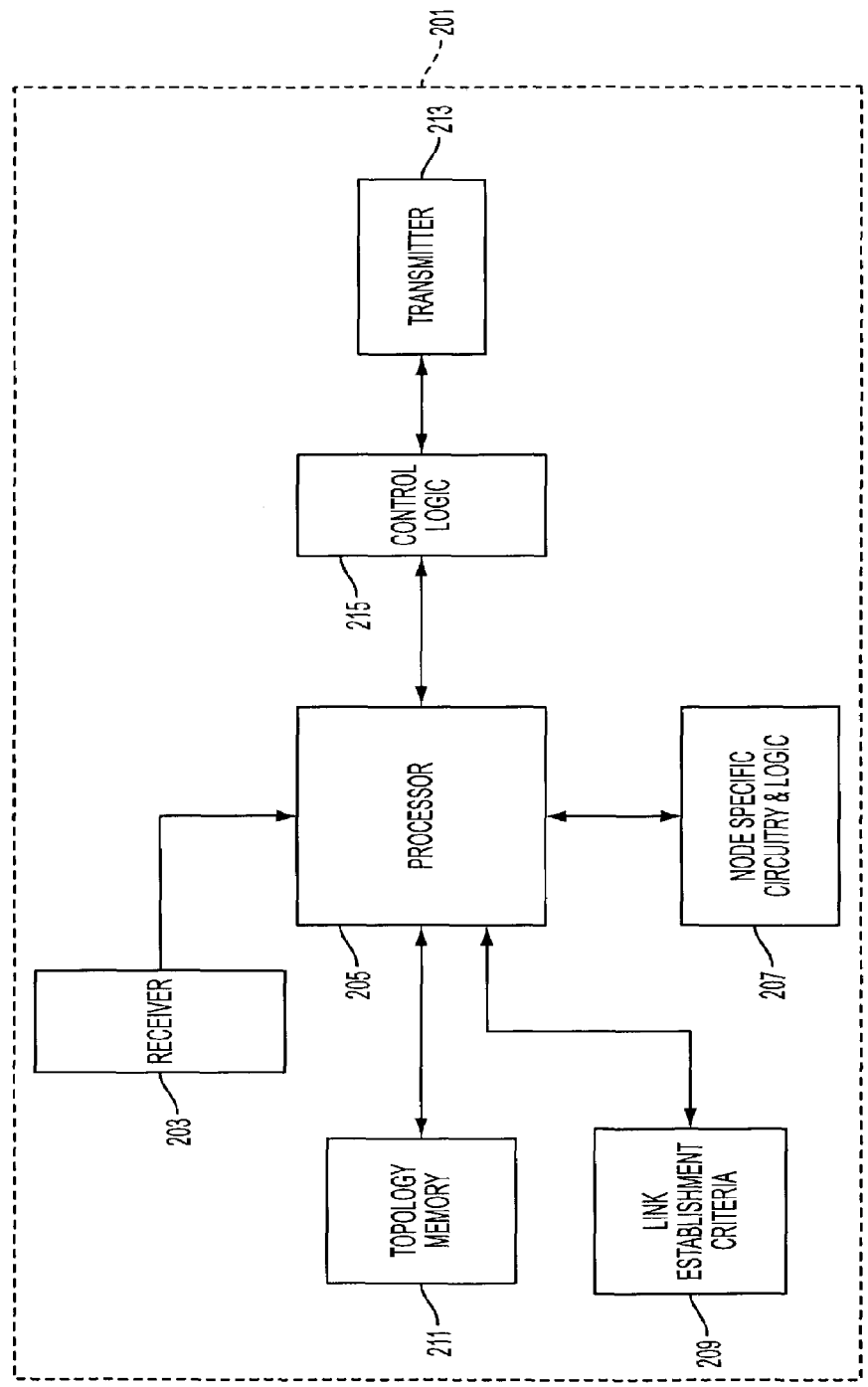
FIG. 2 illustrates a node according to the invention.

An Instant Internet node itself comprises one or more receivers, zero or more transmitters, and control logic to implement the Instant Internet protocols and algorithms. Instant Internet nodes may have other functionality not directly related to communications, for example sensing functionality, more powerful processing capability or general programmability, or a large memory. FIG. 2 illustrates one possible configuration of a node 201 according to the invention. As illustrated in FIG. 2, a node according to the invention includes one or more receivers 203 and a processor 205. Receiver 203, refers to a device that receives communications over the communications link established between node 201 and other nodes. As previously discussed, receiver 203 could be any type of communication receiver compatible with various media, including but not limited to, a receiver for fiber optic communications, a receiver for RF communications in desired frequency ranges, a highly directional receiver, including HF RF and free space optical receivers, a receiver adapted for cable or fixed line communications or other any other suitable communications device. The node may also have node specific circuits and logic 207 which implement the functions to be performed by the node. Such specific circuits may include sensors, monitoring equipment, trigger circuits and other features. Operational control of such circuits may be a feature of processor 207. In accordance with the invention, processor 207 is programmed to implement link establishment criteria, for example as stored in a memory 209. Those of ordinary skill will recognize that these link establishment criteria may be programmed directly into the processor in any manner compatible with the processor design. The processor 205 also utilizes topology information stored in memory 211. One function of the 205 is to determine based on the current topology information and the link establishment criteria, which communications links the node should establish and when these links should be set up. As discussed above, a system according to the invention may receive and recognize information concerning changes to the topology, including changes that have already occurred or will occur at some future time. For example, when another node advertises through a broadcast message that it is about to change a communication link, receiver 203 will receive that information and pass it on to the processor 205. Processor 205 will recognize the information and pass it on to topology memory 211. When processor 205 needs to access topology information for its own purposes, the information in topology memory 211 will be up to date.

Similarly, there may be circumstances where the link establishment rules may require adjustment. In those cases, receiver 203 receives the link adjustment message and activates processor 205, which direct storage of the revised link establishment information in memory 209. When processor 205 needs to access the link establishment rules and criteria for its own purposes, it applies the revised, up to date information.

Optionally, node 201 also includes one or more transmitters 213 and control logic 215. Like receivers 203, transmitters 213 can be any transmitters compatible with media or modes of communication desired. Indeed, it is possible that the node could establish a communications link using a receiver operating over one form of media and transmit over a different form of media. Control logic 215 provides an interface between the processor 205 and transmitters 213.

TCP/IP, Link-state Routing Protocol

Instant Internet according to the invention can communicate using any known or custom developed protocol. One example of a preferred known protocol is the TCP/IP protocol family. Use of TCP/IP allows Instant Internet to interoperate with other TCP/IP networks. Routing in Instant Internet may use either source routing or hop-by-hop routing.

An Instant Internet network according to the invention uses a routing protocol to advertise routes to nodes. Some or all of the nodes in the Instant Internet network may perform routing. In one preferred embodiment, the routing protocol is a link state routing protocol, because a link-state protocol is more convenient for disseminating the characteristics of links that are important to the Instant Internet routing protocol and routing mechanisms. In a link state routing protocol, nodes that perform routing maintain a map of the topology of the network. This map, which includes relevant information about links such as bandwidth, delay, jitter, etc., is maintained by the exchange of protocol messages known as link state advertisements (LSAs). In a conventional link-state routing protocol, LSAs are broadcast by each routing node to all other routing nodes in some subset of the network periodically or when the node detects that a link has changed status. According to the invention, Instant Internet nodes predict upcoming changes in the network topology. Nodes responsive to these predicted changes advertise changes in their links.

Movement Models, Dead Reckoning, Forwarding a Flight Plan

In one application according to the invention, Instant Internet nodes use mobility prediction to estimate when a link will fail due to the relative movement of nodes. Those of ordinary skill will recognize that within the scope of the invention, the nodes can employ other predictive criteria. For instance, Instant Internet nodes may also estimate link failure for other predictable reasons, such as battery failure. Mobility prediction is useful where highly directional free space optical communications to or from a mobile node are in use, and has been demonstrated in satellites. According to the invention, an Instant Internet node tracks the movement of other nodes within communications range, using an appropriate tracking technology. One such technology is disclosed by M. Scheinfeild, et al. in "Acquisition Time Calculation and Influence of Vibrations for Micro Satellite Lace Communication In Space" SPIE Proceedings, Acquisition, Tracking and Pointing XV vol. 4365 pp 195-205 April, 2001. The node then builds models of the movement of other nodes, using techniques familiar in distributed simulation frameworks such as HLA and DIS known as "dead reckoning". Simple techniques such as extrapolating a node's position by assuming its velocity remains constant can be used if processing capability is limited and the physical medium doesn't require it. Some media, particularly free space optical communications at long distances, however, require very accurate motion models. For a node that already has an accurate motion model of other nodes, it would be desirable to reuse this model for the routing protocol as well. In the case of satellites, orbital motions can be predicted very accurately from Newton's law of gravitation. If a node's movement will involve much acceleration (e.g., an aircraft executing turns), and the node can predict this in advance, that node may inform other nodes of its future intended maneuvers, i.e. forward a flight plan.

Movement models or other links failure prediction programs need not be fixed or pre-programmed into nodes. Movement model information can be exchanged between nodes. Movement models may automatically be distributed throughout the network, alleviating the need to pre-program the nodes with movement models. Similarly, updates or changes to movement models or link failure prediction programs or criteria can be distributed through the network. Thus, the nodes can be re-programmed to adapt to changing realities of the network.

Scoping to Reduce State

Instant Internet nodes which route packets maintain a model of the topology of the network, just as is done in other link state protocols such as OSPF. The model used by an Instant Internet node may be limited in scope to the immediate network neighborhood of a node to save memory. This approach is particularly useful in networks that are very large.

Estimated Lifetime of Links, Advertisement of To-Be-Established Links

According to the invention, Instant Internet's network layer uses models of the movement of nodes to predict how the topology will change over time. In particular, each node that establishes a link predicts the time (according to some reference time such as UTC) when the link will fail or go down due to node movement (i.e. lost line of sight, out of range). This estimated failure time is sent as part of the link state entry that advertises that link to other nodes. Other data included in the entry tells what media is used, which node originated the link, uplink and downlink bandwidth, and other useful attributes. Other nodes can use the estimated failure time of the link to determine when they should update their model of the network's topology. Nodes that will establish a link in the future send out a special link state entry that includes the time (in UTC or some other reference) when the link will become active. This allows other nodes to take the presence of the to-be-established link into account when they determine where to establish new links themselves. In addition, an LSA may contain information about multiple links; each link is described with a link entry, and there may be multiple link entries included in an LSA.

Beaconing

In another aspect according to the invention, to aid Instant Internet nodes in locating each other, a beacon signal may be used. A beacon signal is preferably omni-directional, or at least radiated over a large solid angle from the emitting node so that as many nodes as possible have a chance to detect it. Preferably, the beacon signal carries information about what kinds of receivers the emitting node has and their status (i.e., busy or not). The beacon signal may be encrypted to prevent unauthorized entities from learning this information. The beacon signal may be radiated in short, periodic bursts to decrease the likelihood of the emitting node being detected, or to avoid interference with other users of the same spectrum.

Procedure to Determine Where to Establish a Link

In general, according to the invention links may be unidirectional. Thus, a "transmitting" node and a "receiving" node are used further herein to distinguish the two endpoints of a unidirectional link. Bi-directional links may be established by setting up two unidirectional links in different directions between the same two endpoints.

Figure 3:
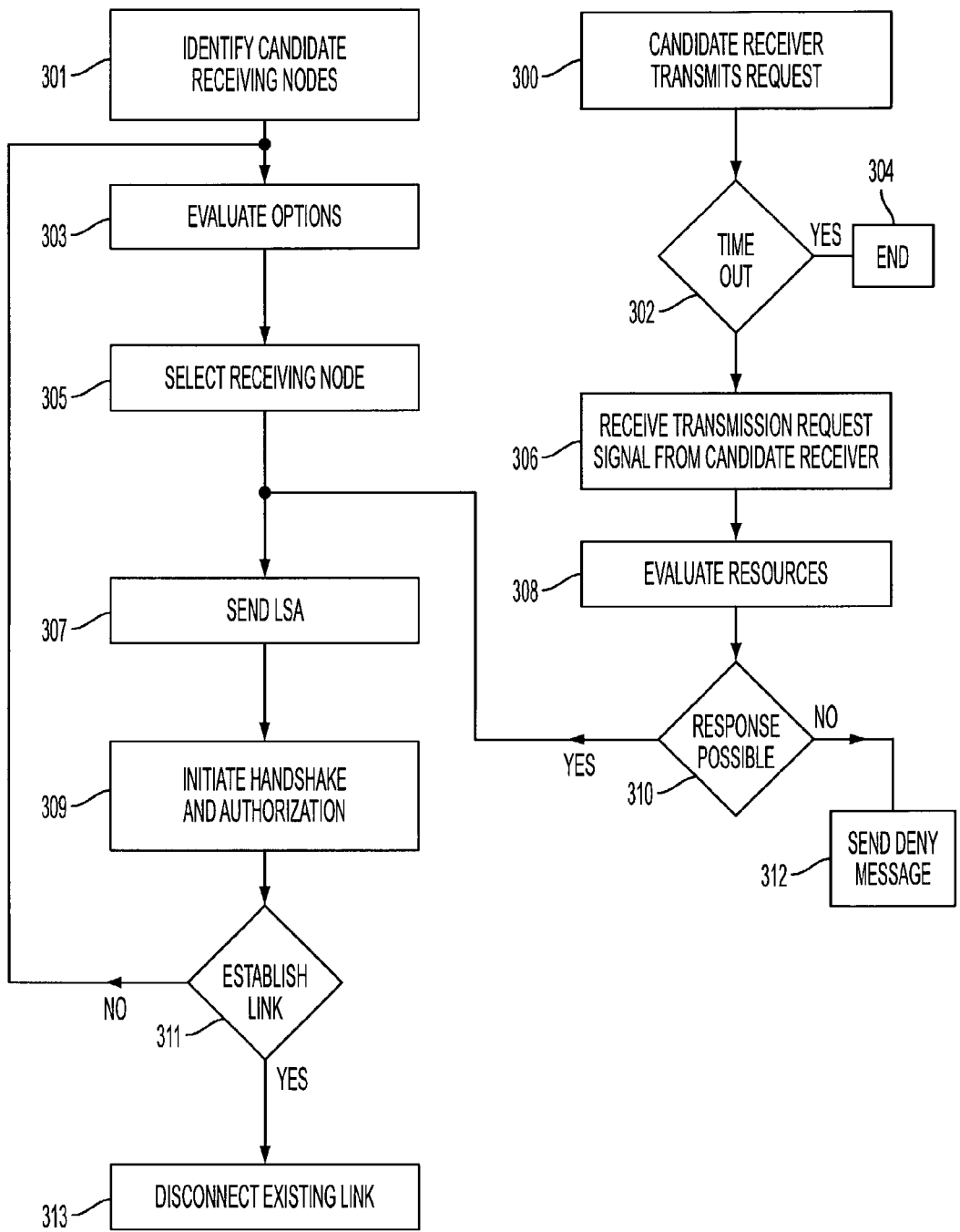
FIG. 3 illustrates one method of operation according to the invention.

As shown in FIG. 3, a node that has one or more spare transmitters or seeks to establish a new link establishes such links as follows: In step 301 the node may identify candidate receiving nodes, for example, through their beacon signals, through special messages from the network manager, or through knowledge of the network topology and status of individual links in that topology. In step 303, the node executes a program to evaluate the options. The transmitting node may use the time-out value for a particular link, for example, to determine that one of the endpoints for that link will be free to receive its transmission when the link times out. If the link to be established uses a highly directional physical layer (e.g. optical), the transmitting node will have to track the intended receiving node with precision before link establishment. The tracking may be assisted by previous "flight plans" disseminated by the receiving node. The result of this program execution is selection of a node for establishment of a communications link, as shown at step 305.

The transmitting node may declare its intention to establish a link to the receiving node in advance using a special link entry in an LSA. As shown at step 307, this LSA should be sent to the receiving node explicitly in addition to being broadcast within the transmitting node's local scope, if scoping is being used to reduce the size of the network topology which individual nodes keep track of. If the receiving node is connected to the same part of the network as the transmitting node, and if the receiving node receives the LSA containing the announcement that the transmitting node wants to establish a link with it, the receiving node may send out a LSA canceling the link setup (i.e. negating the link entry in the transmitting node's LSA). If it does this, the receiving node should address the LSA to the transmitting node specifically, in addition to broadcasting the LSA in the local scope.

At the time the transmitting node transmits to the receiving node, a handshake takes place to establish the connection and a mutual authentication protocol takes place to authenticate both nodes to each other as shown at step 309. Any suitable handshake and authentication protocol may be used while remaining within the scope of the invention. If the receiver declines the link at this time, the transmitting node attempts to establish a link with some other node as shown at step 311. If the link is established the existing link is disconnected as shown at step 313.

Links are typically established by the transmitting node, because it is natural that the node originating the signal establishes the link. However, a receiving node could just as easily establish a link, provided it could signal the transmitting node to initiate transmission. Such a signal could be provided, for example, by a message sent via the network, provided both endpoints were already connected to it. For example at step 300, the receiver node requesting to establish a communications link signals the target transmitting node. The node tests for a time out at step 302 to determine if the target transmitter has already been non-responsive to a previous request. If so, the process ends as shown at step 304 and the receiving node can take other action. If no such time out has occurred the message is received by the target transmitting node as indicated at step 306. At step 308 the target transmitting node evaluates it resources to determine if it can respond to the request. If the target transmitting node cannot respond as indicated in step 310, it attempts to send a request denial message at step 312. If the target transmitting node can accommodate the receiver, it sends an LSA and proceeds from step 307 as previously discussed.

Picking a Good Candidate Receiver

A node seeking to establish a link according to the invention should try to create a link that will most benefit the network and the network's objectives. Link establishment and candidate receiver selective rules may differ depending upon the functions and goals of the network. When programming link establishment and receiver selection rules, the following considerations are typical: Often the link-establishing node will be planning to establish the link a short time in the future, so it may be useful for the link establishing node to anticipate future conditions. The following characteristics of candidate receiving nodes are desirable:

1. Nodes that will have a compatible receiver available when it is time to establish the link are required.
2. Nodes that the network manager has designated as being high priority to have connectivity to the rest of the network, or nodes which will have fewer incoming links than the network manager has specified may receive higher priority than other candidates for which a node may establish a link. For example, the network manager may specify a minimum or preferred number of incoming and outgoing links for a high priority node, which other nodes strive to maintain by establishing and accepting links from this high priority node.
3. Nodes that are part of a connected subnetwork of the overall network, where the subnetwork has no or few incoming links from the part of the network to which the transmitting node belongs might also receive priority. In this way, the link-establishing node seeks to reunite parts of the network that have become isolated (or isolated in the direction that the link is trying to establish). Two sub criteria can be used to rank isolated subnetworks:
   a. The greater the number of nodes in the isolated subgraph, the greater the importance that should be assigned to reuniting it, when the transmitting node must decide between two isolated subnetworks.
   b. The longer a subnetwork has been isolated, the greater the importance that should be assigned to reuniting it to the remainder of the network unless security considerations dictate otherwise.
4. Nodes that will be in range or line of sight the longest, so that links established to them will have the longest predicted lifetime may also be considered high priority candidates for a node seeking to establish a communications link.

Although the first two criteria above can be strictly applied to rank nodes, it may not desirable to do so for criteria 3. and 4. Instead, a scalar score derived from giving a weight to each of criteria 3.a., 3.b., and 4. can be used in a preferred embodiment of the invention. Moreover, determining whether a subnetwork of the network is isolated becomes a difficult problem if the network nodes don't have global knowledge of the network. In one preferred embodiment, nodes don't have such knowledge because in a large network the information storage requirements to track the state of each node are too large. Instead, nodes maintain knowledge of a subset of the network called a scope. Thus, for the purposes of evaluating characteristic 3. herein, one can determine whether the subnetwork is isolated within a node's scope. The scalar weighting is as follows:

$$W = \alpha N + \beta I + \epsilon L$$

where W is the weight or score of a candidate node, N is the number of nodes in the isolated subnetwork to which the candidate node belongs (0 if the candidate node is not in an isolated subnetwork or is in the same one as the link-establishing node), I is the number of seconds since the candidate node's subnetwork has been isolated (0 if the candidate node is not in an isolated subgraph or is in the same one as the link-establishing node), L is the expected lifetime of the prospective link between the link-establishing node and the candidate node in seconds, and $\alpha$, $\beta$, $\epsilon$ are coefficients. The optimum ratios for $\alpha$, $\beta$, $\epsilon$ will depend on network parameters such as number and density of nodes, and may differ for different environments of interest. For example, when the node seeking to establish a link transmits infrequently, but seeks to broadcast to all nodes when it does transmit, $\alpha$ may be assigned a value of 1, while $\beta$ and $\epsilon$ are assigned lower values. In the same network where the data transmission is expected to be relatively long, $\epsilon$ may be assigned a value higher than $\beta$. In other networks, other coefficient relationships and values will depend on the characteristics of the node seeking to establish a link and the corresponding subnetwork.

Security

An adversary could cause much mischief if it could spoof routing protocol messages or network management messages. Accordingly, in another embodiment of the invention, all network layer messages are encrypted, in addition to encrypting messages at the link layer, where such layers refer to the layers defined in the Open Systems Interconnection model defined by the International Standards Organization.

Network Management

In an operational environment, it may become more important for certain sets of Instant Internet nodes to communicate with each other than it is for the network as a whole to remain connected. To handle such a situation, an Instant Internet architecture according to the invention allows for a network manager to assign priority to having certain nodes connected to the rest of the network. To accomplish this, a special message called a priority message is broadcast to the network. The priority message can be broadcast from a network manager node or from any node authorized by the network manager. The node broadcasting the message need not be a high priority node. An authentication code can be broadcast along with the message so that the receiving nodes can confirm the node transmitting the priority information is properly authorized to do so. Any other authentication method can be used without departing from the scope of the invention. In one embodiment, the priority message contains one or more priority entries, which specify a designated node's address, the number of links to be maintained to the designated node and their types (i.e. incoming or outgoing), and a priority value for that node. The priority value is used in the event that two nodes have conflicting demands for the same type of link, and a node seeking to establish a link must choose between them. The aforementioned scheme is just one possible way to accomplish the goal of assigning priorities to nodes. Other priority assignment methods may also be used without departing from the scope of the invention.

In an Instant Internet architecture, a network manager may also have the ability to adjust other parameters of the routing protocol, such as the size of the scope maintained by nodes and the formula used to rank candidate receivers of a link. As previously illustrated, a node can be directed to upload revisions to link establishment rules.

Modes of Deployment

Instant Internet nodes according to the invention may be advantageously deployed on vehicles and devices whose primary purpose is not communications. One suggested military mode of deployment is to place Instant Internet nodes on the bus of an ICBM or SLBM, so that they are deployed into orbit when the bus separates from the spent second stage of the missile. Instant Internet nodes would be made sufficiently light and small so as not to affect the mass properties or space of the bus. For example, an optical intersatellite link transceiver could be fabricated to have a mass of just 10 kg and volume of 2000 cubic centimeters. Instant Internet nodes could also be placed on ICBM or SLBM boosters, $2^{nd}$ stages, or in RVs/RBs not carrying a warhead. Instant Internet nodes deployed on ICBMs or SLBMs could also serve a reconnaissance role, if equipped with cameras or other sensors.

Other potential military platforms for Instant Internet node deployment include aircraft, cruise missiles, bombs, ships, and land vehicles such as tanks. In such applications, Instant Internet nodes according to the invention would be small, light, and use communications techniques that would not interfere with other communications or make the platform more vulnerable to detection and attack. Such techniques include short duration bursts, spread spectrum, and highly directional RF or optics.

Commercial applications in geographic surveying, telecommunications and other endeavors where multiple mobile devices could benefit by connecting to a network through communications links could also benefit from an architecture implementing a method and system according to the invention.

What is claimed is:

1. A node for use in a wireless network having a plurality of nodes said node comprising:
   memory configured to store information corresponding to a topology of nodes and communications links for at least a portion of said network including said node; and
   a processor responsive to program indicia to predict changes in said topology, so as to allow said node to exchange information with others of said nodes in said network at different points in time,
   wherein said processor receives and processes said information stored in said memory corresponding to said topology of nodes and communication links to predict said changes in said topology and to output data indicative thereof,
   said program indicia including code to instruct said node to establish a wireless communication link with a second node of said nodes in said topology and to add and drop wireless communication links among said nodes to satisfy network communication requirements so as to allow said node to exchange information with said second node of said nodes in said topology at a later point in time, based on the changes in said topology predicted by said processor.

2. A node as recited in claim 1, said processor being responsive to predict a failure of said wireless communication link established between said node and said second node and to establish another wireless communication link prior to said failure.

3. A node as recited in claim 2, said failure comprising one of an inability of said wireless communication link to carry any traffic and an inability of said wireless communication link to carry additional traffic.

4. A node as recited in claim 2, wherein said another wireless communication link comprises one of another wireless communication link linking said node to said second node and a wireless communication link linking said node to a third node in said topology.

5. A node as recited in claim 2, wherein said processor predicts said failure based on changes in physical positions of said nodes.

6. A node as recited in claim 2, wherein said processor predicts said failure based on predictable characteristics of said nodes.

7. A node as recited in claim 6, said node comprising indicia of said characteristics of said node.

8. A node as recited in claim 2, wherein said processor predicts said failure based on predictable characteristics of said wireless communication link.

9. A node as recited in claim 8, said node comprising indicia of said characteristics of said wireless communication link.

10. A node as recited in claim 2, wherein said processor predicts a time of said failure.

11. A node as recited in claim 2, wherein said processor predicts said failure based upon relative movement between said node and said second node, said relative movement being determined by said processor based on a model that represents expected movement of said nodes in said topology, said model being stored in said memory.

12. A node as recited in claim 2, wherein said node transmits a message to said other nodes in said topology advertising characteristics of said communications link.

13. A node as recited in claim 12, said characteristics comprising information for said others of said nodes to set up to establish a wireless communication link with said node before said failure.

14. A node as recited in claim 12, said characteristics comprising information for said others of said nodes to update topologies stored therein as said network changes.

15. A node as recited in claim 12, wherein said characteristics include at least one of predicted failure time, transmission media of said link, bandwidth of said link, delay and jitter.

16. A node as recited in claim 2, wherein said processor selects said another wireless communications link among candidate links according to programmed criteria.

17. A node as recited in claim 2, said node tracking physical movement relative to other nodes of said plurality within a range of communication with said node over said wireless communication link.

18. A node as recited in claim 17, said processor having program indicia rendering said processor responsive to said tracking to predict changes in said network topology.

19. A node as recited in claim 17, said processor having program indicia directing said processor to predict movement of said node.

20. A node as recited in claim 19, said processor having program indicia directing said processor to transmit to other nodes of said plurality information about said movement predicted by said node.

21. A node as recited in claim 2, said node comprising indicia representing a motion model of other nodes of said plurality of nodes and program indicia to apply said motion model to establish a wireless communication link.

22. A node as recited in claim 21, said node comprising program indicia to apply said motion model to establish a communications routing model.

23. A node as recited in claim 22, said node routing information packets along said wireless communication link.

24. A node as recited in claim 17, said node comprising program indicia rendering said processor operative to predict a time of failure of said wireless communication link.

25. A node as recited in claim 24, said node comprising program indicia rendering said processor operative to transmit a message comprising a predicted time of failure of said wireless communication link to other nodes of said plurality of nodes.

26. A node as recited in claim 2, said node comprising program indicia rendering said processor operative to transmit a message comprising a time when said node will establish a new wireless communication link.

27. A node as recited in claim 26, said node comprising program indicia rendering said processor operative to determine an update of said topology based on receipt of a message including a predicted failure of said wireless communication link.

28. A node as recited in claim 26, said node comprising program indicia rendering said processor operative to determine an update of said topology based on receipt of a message including a time when said node will establish said new wireless communication link.

29. A node as recited in claim 2, said node comprising a receiver, control logic, and a transmitter, said transmitter being directed to transmit in a particular direction and at a particular power level by said control logic based on said data output from said processor to said control logic that is indicative of said changes in said topology.

30. A node as recited in claim 29, further comprising a beacon signal transmitter, wherein said beacon signal transmitter transmits a beacon signal detectable by other nodes of said plurality to indicate presence of said node in said topology.

31. A node as recited in claim 30, said beacon signal comprising signals indicating characteristics of said receiver.

32. A node as recited in claim 31, said beacon signal being encrypted.

33. A node as recited in claim 29, said beacon signal transmitter being operative to transmit said beacon signal over a solid angle from said node.

34. A node as recited in claim 29, said beacon signal transmitter being operative to transmit an omni-directional beacon signal.

35. A node as recited in claim 31, said characteristics of said receiver comprising receiver type and receiver busy status.

36. A node as recited in claim 2, said program indicia including code to identify candidate replacements for said second node and evaluate options to select among said candidates.

37. A note as recited in claim 36, said program indicia comprising code to establish a score for each of said candidate replacements.

38. A node as recited in claim 36, said program indicia comprising code to identify which of said candidate replacements has a compatible receiver available to establish said another wireless communication link at a time of said failure.

39. A node as recited in claim 36, said program indicia comprising code to establish priorities among said candidate replacements.

40. A note as recited in claim 39, said program indicia comprising code to establish said priorities by setting a preferred number of wireless communication links for each of said candidate replacements.

41. A node as recited in claim 39, said program indicia comprising code to establish said priorities by identifying from said candidate replacements, nodes connected to a subnetwork having few links to a portion of said network connected to said node.

42. A node as recited in claim 41, said program indicia comprising code to establish said priorities by assigning a higher priority to a first isolated said subnetwork with a larger number of nodes than the number of nodes in a second isolated said subnetwork.

43. A node as recited in claim 41, said program indicia comprising code to establish said priorities to assign an increasingly higher priority to an isolated subnetwork as the time of isolation increases.

44. A node as recited in claim 41, said program indicia comprising code to establish said priorities by assigning to each of said candidate replacements a score arrived at by weighting the number of nodes in an isolated said subnetwork, time of isolation, and an expected lifetime of said another wireless communication link.

45. A node as recited in claim 44, said program indicia comprising code to establish said weighting based on at least one of a number of said nodes a diversity of said nodes, a length of transmission by said node, a number of said plurality of nodes receiving a transmission from said node.

46. A node as recited in claim 39, said program indicia comprising code to broadcast a priority message to said network, said message comprising at least one of an identity of a designated one of said nodes, information of a preferred number of said communication links and types of said links for said designated node and a priority of said node.

47. A node as recited in claim 45, said program indicia comprising code to broadcast an authentication code.

48. A node as recited in claim 21, said program indicia representing said motion model being re-programmable.

49. A node as recited in claim 48, said program indicia being distributed to said node through other nodes of said network.

50. A node as recited in claim 1, wherein said processor determines a strategy for communicating with others of said nodes based on the predicted changes in said topology, so as to maintain communications contact with at least one other node of said plurality of nodes in said network at all future points in time.

* * * * *